Feb. 3, 1931.   R. E. MANLEY   1,791,072
BRAKE BAND DRILLING MACHINE
Filed May 31, 1924   2 Sheets-Sheet 2
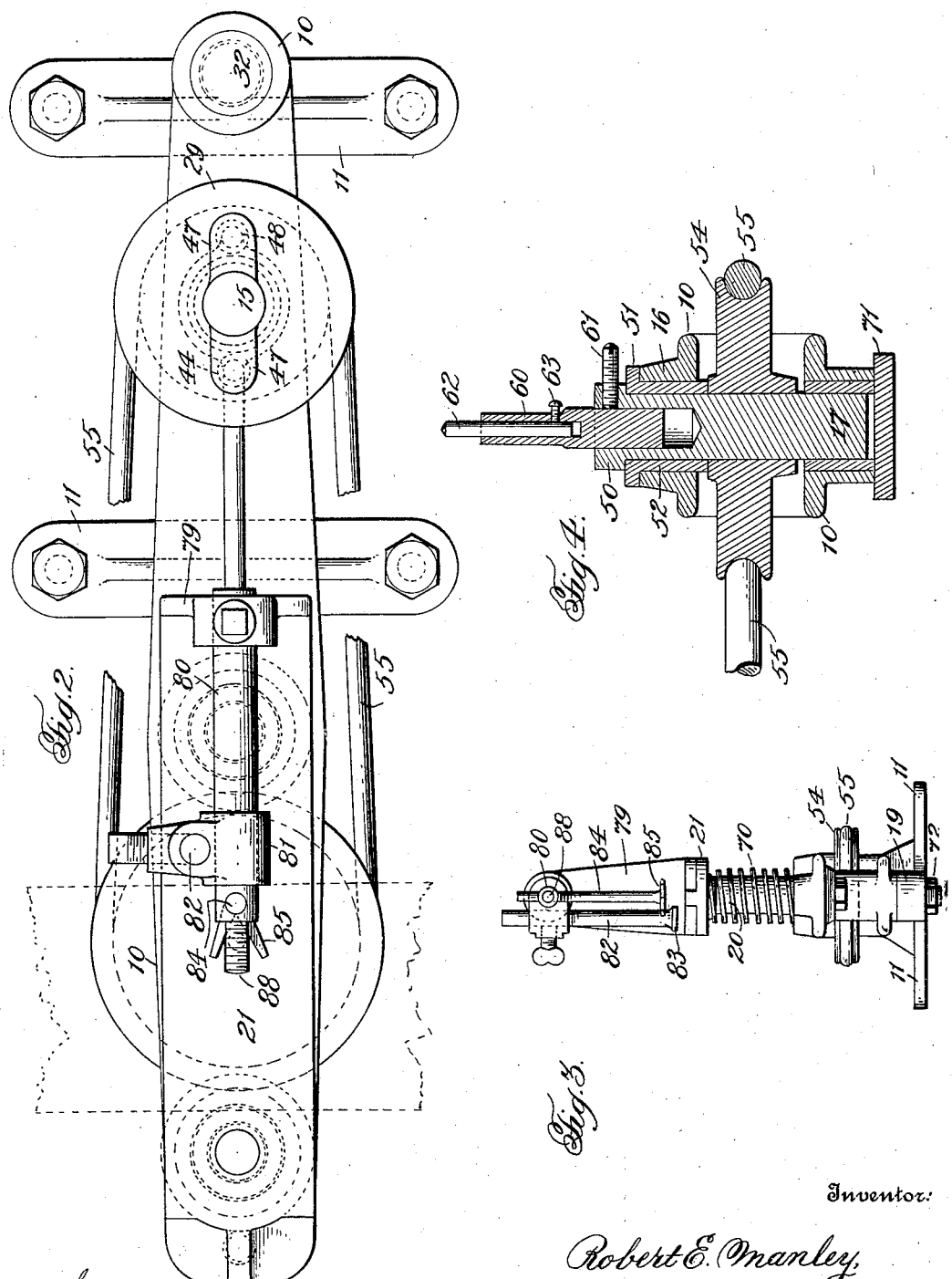
Inventor:
Robert E. Manley,
By Henry H. Snelling
His Attorney Patented Feb. 3, 1931

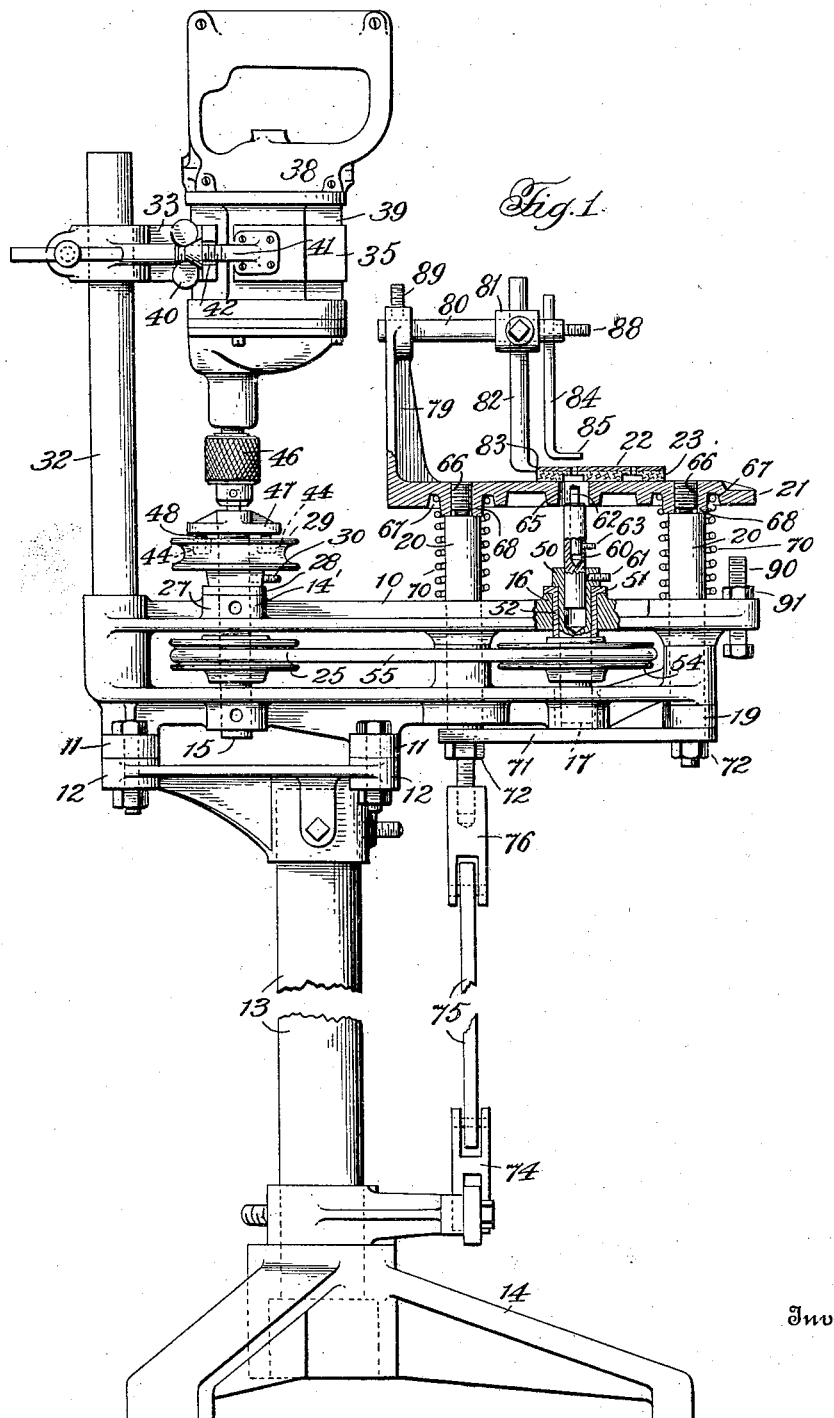

1,791,072

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

BRAKE-BAND-DRILLING MACHINE

Application filed May 31, 1924. Serial No. 716,949.

This invention relates to a device for readily and conveniently drilling brake band linings for the reception of the usual rivets and for countersinking the lining material, and has for its principal object the provision of a simple and efficient machine for carrying out this purpose.

A further object of the present invention is the provision of a drilling machine of the type specified capable of quickly and easily drilling brake bands of very small diameter. Other and further objects of the present invention will be apparent from the description following and are particularly set forth in the claims.

In the drawings:

Fig. 1 is a side elevation partly in section showing the entire device;

Fig. 2 is a top plan view; and

Fig. 3 is an end view of the forward portion of the device.

Fig. 4 is a transverse vertical section through the drill shaft.

The main frame of the machine is numbered 10 in the drawings and consists of a support having laterally extending feet 11 by which the device may be attached near the edge of a table or other support, or as shown in the drawings these feet 11 may be bolted to similar feet 12 on a standard 13 having at its lower end a floor engaging base 14, the structure shown forming a very convenient unit of easy portability. The frame 10 has bearings 14' for the primary shaft 15 and similar bearings 16 for the drill shaft 17, each of these shafts being vertical and parallel. The frame 10 also carries a pair of bearings 19 to receive slidably the guide rods 20 which support the horn or bed 21, which serves as a rest for the brake band, the metal portion of which is denoted 22 and the lining 23.

The primary shaft 15 carries a pulley 25 spaced away from the frame but in engagement at its top with a bushing 27, having a cylindrical portion fitted to the frame and rotatively receiving the primary shaft 15, and also having an integral radially extending flange 28 resting on the frame and supporting on its upper surface a pulley 29 secured to the primary shaft 15 by any desired means such as the set screw 30. It is obvious the pulley 29 may be integral with the shaft 15, in which case it would simply be a circular head on the shaft, but I prefer the details as shown and utilize the pulley 29 to drive the mechanism in such cases where it is more convenient to permanently mount the drill with respect to a prime mover.

In order to have the device self-contained and portable, I prefer to mount a post 32 at one end of the frame and to secure to this post a yoke 33 into the slotted arms of which I secure the ends of an adjustable band 35, to each end of which I rivet a bolt preferably fitted with wing nuts as shown for ready and convenient detachment of the band and the motor drill 38 held thereby. This motor drill is of standard type and has a hexagonal central body portion 39 fitting nicely in the correspondingly angled V of the yoke. While the yoke may be adjusted up and down on the post, no such adjustment is actually used in practice after the drill is once fitted, and to release the motor drill it is only necessary to unfasten one of the wing nuts 40 sufficiently to allow its bolt 41 to slip out of the slot 42 in the arm 33.

While theoretically it is possible to arrange the axis of the motor co-axially with the axis of the primary shaft 15, this is extremely difficult in practice, and for this reason I provide a plurality of recesses 44 in the pulley 29 and I secure to the clutch 46 of the motor a disc-like member 47 having a plurality of lugs 48, each fitting loosely in one of the recesses 44 so that the disc-like member 47 and the pulley 29 form in effect a universal joint which has proven extremely useful in practice.

The drill shaft 17 has a head 50 riding on the horizontal flange 51 of a sleeve exactly similar to the sleeve 17 and having its cylindrical portion 52 in friction contact with the frame and rotatively receiving the spindle or shaft 17. This bushing, like the corresponding one for the primary shaft extends below the level of the frame and engages the upper horizontal surface of the pulley 54, which is connected to the driving pulley 25 by a belt 55. This configuration of the two bushings materially saves in the cost of manufacture of the device as it obviates all machining of the frame or casting and of the bushing itself, and, at the same time, definitely positions the pulleys on their respective shafts.

The spindle 17 is counterbored to receive the countersink 60, which is held in adjusted position by means of a set screw 61 and is itself counterbored to receive the drill bit 62, likewise held in adjusted position by a set screw 63. In order to avoid the crossing of the belt 55 and also to secure other desired advantages I utilize a left-handed countersink and drill. This allows me to use a standard motor drill and to maintain the axis of the drill and of the motor parallel.

The bed 21 consists of a rectangular body portion having a central hole 65 therein to receive the drill and counterbore and also a plurality of holes 66 tapped to receive the threaded end of the shouldered guide rods 20. I find it convenient to provide concentric grooves 67 in the bottom of the bed coaxial with the tapped holes 66 and to utilize the metal from these grooves in extending the sleeves 68 below the level of the bottom of the bed where they are engaged with the larger portions of the guide rods 20, the grooves 67 serving as anchoring recesses for the helical springs 70. The tie plate 71 secured to the two guide rods 20 by means of the bolts 72 is for the purpose of strength, as it, with the bed 21 and the guide rods, form a rectangular frame. The foot operated lever 74 connected to one of the guide rods 20 by means of the link 75 and gear 76 is optional, but is convenient in case the standard 13 is used, and it may be used when the frame is mounted on a table as well, although some users prefer to depress the bed by hand which is very easy since the metal band extends laterally from the table furnishing a convenient hand-hold and renders the depression of the horn quite simple.

At the rear end of the bed I mount a bracket or post 79, which adjustably receives a horizontal rod 80, on which is slidably mounted a sleeve 81 in which is mounted a stop member 82 having a plane vertical face 83 against which the steel portion 22 of the brake band is placed, this serving to register one of the two series of holes in registry with the drill 62. A locating indicator 84 is mounted on the rod 82. This indicator has at its lower end a fork 85 by means of which the holes in the brake band may be brought into exact registry with the drill no matter what particular size of drill is used. In order to accomplish this, the bed is lowered so that the drill projects well above the bed. The locating indicator 84 is now moved until the drill bit is in contact with each of the two sloping sides of the V of the fork and the set screws 88 and 89 are now secured in place. The brake band itself may next be placed on the bed, the top of which may be either plane or curved and with the edges of the brake band at right angles to the line between the holes 65 and 66. It is now convenient to move up the stop member 82 into contact with the metal edge of the brake band, as in so doing all of the holes of that series, and of the other series as well, when the band is reversed, are brought in proper fore and aft relation to the bed so that all the operator need do is to move the band laterally to adjust for each individual hole.

To operate, a band is placed on the bed 81 and after adjustment as just described the bed is depressed into contact with the stop member 90 held in proper position by a locknut 91 on the frame, the depression of the bed causing the drill to first pass through the lining and then pass snugly through the existing hole in the metal portion of the band, while the countersink reams the lining to the proper depth to bury the rivet head.

What I claim is:

1. In a brake band drill, a drill, means for rotating said drill, a bed having an opening for such drill, guiding means for holding said bed constantly normal to the axis of the drill and a locating indicator adjustably mounted with respect to said bed, movable therewith, and positioned to one side of the axis of said drill.

2. In a device for drilling automobile brake bands, a frame and shouldered shaft rotatably mounted in said frame, a pulley mounted on said shaft beneath said frame, a bushing between said shaft and said frame contacting with said pulley beneath the lower surface of the frame and having a radially extending flange extending between the head of said shaft and said frame, a drill carried by said shaft and means for supplying power to said pulley.

3. In a device for drilling automobile brake bands, a drill, a bed movable toward and away from said drill and having an opening therein to receive said drill and having a plurality of annular grooves therein, a sleeve integral with said bed and co-axial with each of said grooves and forming the inner wall thereof, said sleeves each extending beyond the lower surface of said bed, a frame in which said drill is supported, a plurality of shouldered guide rods slidably mounted in said frame and each engaging one of said sleeves and a coiled spring surrounding each guide rod and fitting within said grooves, for resiliently holding said bed away from said frame.

4. In a bed for a brake band drilling machine consisting of a main body portion having an opening therein to receive a drill, a support at one end of said body portion, a stop member adjustably carried by said support, and a locating indicator adjustably mounted on said support for indicating the axis of the hole for the drill and countersink, when said hole is hidden by a brake band to be drilled.

5. In a device of the character described a drill, an indicator above and to one side of said drill, means for supporting a brake band between said drill and indicator, said means being movable with respect to said drill.

ROBERT E. MANLEY.